Jan. 12, 1954     P. D. BECKER     2,665,927
JOINT FOR COLATERAL SUPERIMPOSED TUBULAR MEMBERS
Filed June 20, 1950
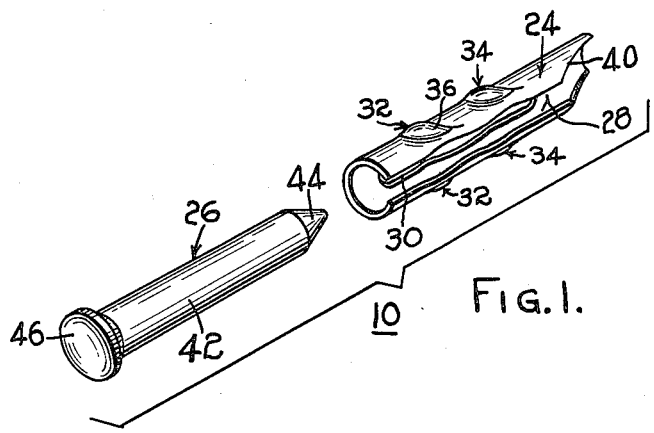
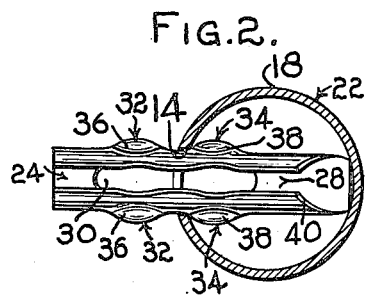
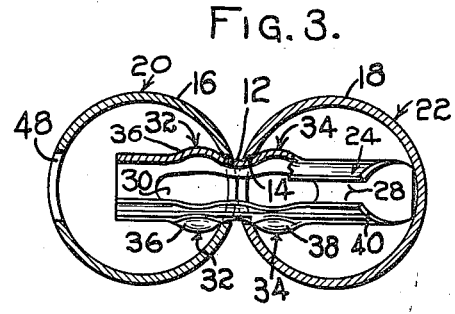
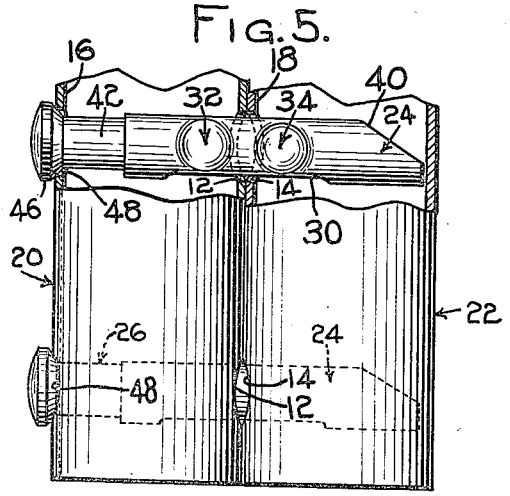
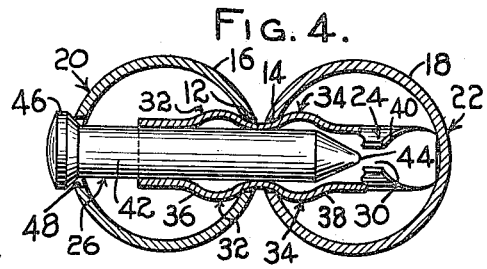
INVENTOR:
PHILIP D. BECKER,
By Robert E Ross
AGENT.

Patented Jan. 12, 1954

2,665,927

UNITED STATES PATENT OFFICE 2,665,927

JOINT FOR COLATERAL SUPERIMPOSED TUBULAR MEMBERS

Philip D. Becker, Hingham, Mass., assignor to United-Carr Fastener Corporation, Cambridge, Mass., a corporation of Massachusetts Application June 20, 1950, Serial No. 169,239

1 Claim. (Cl. 285—21)

This invention relates generally to fastening devices, and has particular reference to a device for fastening together a pair of tubular members by snap fastener engagement in openings in the walls thereof.

The object of the invention is to provide a fastening device which is adapted to receive a tubular member on each end thereof in snap fastener engagement through openings in the walls of the tubular members.

A further object of the invention is to provide a fastening device for assembly in openings in the walls of a pair of superimposed tubular members which is radially resilient to facilitate snap fastener engagement in the openings, and is provided with means for internal support of the snap fastener portions after assembly to prevent disengagement thereof.

A still further object of the invention is to provide a fastening device in which a radially resilient sheet metal cylinder adapted for snap fastener engagement in openings in the walls of a pair of tubular members is adapted to receive support means internally after assembly to prevent disengagement of the snap fastener portions.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is a perspective view of the component parts of a fastening device embodying the features of the invention;

Fig. 2 is a view in section of a tubular member, illustrating the first step in the assembly of the fastening device into a tubular member;

Fig. 3 is a view in section similar to Fig. 2, illustrating the second step in the assembly of the fastening device, in which a second tubular member is assembled on the fastening device;

Fig. 4 is a view in section, of the final step in the assembly of the device, in which the support pin is inserted to retain the fastener in engagement with the tubular members; and Fig. 5 is a view in elevation of a pair of assembed tubular members, illustrating the use of a pair of fastening devices to retain the tubular members in fixed relation to one another.

Referring to the drawing, there is illustrated a fastening device 10, which is adapted for assembly into openings 12 and 14 in the walls 16 and 18 of tubular members 20 and 22.

The fastener 10 comprises a hollow resilient sheet metal cylinder 24, and a support pin 26 for insertion therein as will be hereinafter described. The cylinder 24 is preferablly formed by curling a flat sheet metal blank about a die of suitable shape so that the resulting cylinder 24 has a longitudinal slot 28 on one side thereof, thereby allowing radial expansion and contraction of the cylinder during assembly into the tubular members. To further increase the resilience of the cylinder, a longitudinal opening 30 may be provided on the side opposite the slot 28.

To provide means for engagement with the tubes through the openings 12 and 14, the cylinder 24 is provided with snap fastener shoulder portions 32 and 34 which are spaced apart longitudinally a predetermined distance in the medial portion of the cylinder. In the illustrated embodiment, the shoulder portions 32 and 34 are formed by two longitudinally spaced sets of outward embossments 36 and 38 which are disposed about the periphery of the cylinder. To facilitate assembly of the cylinder one end 40 is tapered toward the side having the slot 28, and the shoulder portion 34 is spaced from the end 40 a predetermined distance depending on the internal diameter of the tube 22, for a purpose to be hereinafter described.

The support pin 26 comprises a cylindrical body portion 42 having a pointed end 44 at one end and an enlarged head 46 at the other end, and is adapted to be inserted into the cylinder to provide internal support thereto.

The tubing members 20 and 22 may be portions of an article of metal furniture or the like. The tube 20, in addition to the opening 12, is also provided with an opening 48 disposed in the wall 16 directly opposite the opening 12. The openings 12, 14 and 48 may be either punched or drilled with equally good results.

To assemble the fastener, the end 40 of the cylinder is inserted into the opening 14 in the tube 22, and forced therethrough until the embossments 38 snap through the opening, which is permitted by radial contraction of the cylinder. When the embossments 38 have passed through the opening, the cylinder expands to cause the shoulder portions 34 on the embossments 38 to engage the periphery of the opening (see Fig. 2). The distance from the end 40 of the cylinder to the shoulder portions 34 is such in relation to the internal diameter of the tube 22 that the end 40 seats against the wall 18 on the side opposite the opening 14 just as the shoulder portions 34 engage the periphery of the opening 14.

In the next step of the assembly operation, the tube 20 is snapped onto the portion of the cylinder projecting from the opening 14, so that the cylinder enters the opening 12 in the tube 20, and the embossments 36 snap therethrough, by radial contraction and expansion of the cylinder as previously described (see Fig. 3). The distance between the shoulder portions 32 and 34 depends on the thickness of the walls 16 and 18 of the tubes, and is such that the radial expansion of the cylinder after assembly causes the engagement of the shoulder portions 32 and 34 in the openings 12 and 14 to pull the tubes together until they are in contact.

To complete the assembly operation, the support pin 26 is driven through the opening 48 into the cylinder 24 until the head 46 of the pin seats against the wall 16 of the tube 20. Since the cylinder 24 is slightly contracted from its normal position by reason of the engagement of the shoulder portions in the openings 12 and 14, the forcing of the pin into the cylinder causes outward expansion thereof and thereby draws the tubes 20 and 22 firmly together by reason of the camming action of the shoulder portions. After the support pin is fully assembled, it is retained in the cylinder 24 by frictional engagement with the internal surface of the cylinder and prevents radial contraction of the cylinder to prevent disassembly of the tubes therefrom.

Although in the illustrated embodiment, the fastener is utilized to fasten together round tubing members, this is exemplary only, since the tubing may have any other convenient shape, such as square or hexagonal. The two tubes to be fastened together may also be of different sizes and shapes. Similarly, it is not essential that the fastener be cylindrical, since a fastener embodying the features of the invention could also be constructed which would utilize, instead of a cylindrical sheet metal member, a square member, with a square support pin for insertion therein.

Since certain other obvious changes may be made in the device without departing from the scope of the invention, it is intended that all matter contained herein be interpreted in an illustrative, and not in a limiting sense.

I claim:

A tubing assembly, comprising a pair of colateral superimposed tubular members, said tubular members having adjacent aligned openings in adjacent wall portions, one of said tubular members having an outer opening in the wall portion directly opposite the aligned openings, and a fastener assembly retaining the tubes in superimposed relation, said fastener assembly comprising an elongated longitudinally split cylinder formed of resilient sheet metal disposed in the aligned openings, said cylinder having spaced outwardly projecting shoulder portions disposed thereon on opposite sides of the adjacent wall portions which bear against the edges of the aligned openings in said wall portions, one end of said cylinder terminating in spaced relation to the outer opening in said one tube, the other end of said cylinder bearing against the wall of the other tube opposite the aligned openings, and an internal support pin disposed inside the cylinder and extending through the aligned openings, said pin having a head disposed outside the outer opening in said one tube.

PHILIP D. BECKER.

References Cited in the file of this patent

UNITED STATES PATENTS

| Number | Name | Date |
|---|---|---|
| 911,624 | Souder | Feb. 9, 1909 |
| 1,855,329 | Wagner | Apr. 26, 1932 |
| 2,110,959 | Lombard | Mar. 15, 1938 |
| 2,118,800 | Smith | May 24, 1938 |
| 2,244,975 | Tinnerman | June 10, 1941 |
| 2,336,153 | Ryder | Dec. 7, 1942 |
| 2,386,922 | Andrews et al. | Oct. 16, 1945 |